UNITED STATES PATENT OFFICE.

CHARLES CHESTER AHLUM, OF CHESTER, PENNSYLVANIA, ASSIGNOR TO E. I. DU PONT DE NEMOURS AND COMPANY, OF WILMINGTON, DELAWARE, A CORPORATION OF DELAWARE.

PROCESS OF PRODUCING ANILIN HYDROCHLORID.

1,303,624.          Specification of Letters Patent.     Patented May 13, 1919.

No Drawing.      Application filed September 21, 1917. Serial No. 192,449.

*To all whom it may concern:*

Be it known that I, CHARLES CHESTER AHLUM, of Chester, in the county of Delaware and in the State of Pennsylvania, have invented certain new and useful Improvements in Processes of Producing Anilin Hydrochlorid, and do hereby declare that the following is a full, clear and exact description thereof.

My invention relates to a process of producing anilin hydrochlorid in an advantageous manner by the use of hydrochloric acid gas, and particularly by causing hydrochloric acid gas to react with anilin dissolved in a solvent in which it is more soluble than anilin hydrochlorid. Hitherto, anilin hydrochlorid has been prepared by dissolving anilin in a strong aqueous solution of hydrochloric acid and then cooling the solution to separate out the crystals of anilin hydrochlorid after which the crystals were filtered off and dried. The aqueous mother liquor was then concentrated to bring down a further quantity of the crystals, which were filtered off and dried in a similar manner. This was repeated until all of the anilin hydrochlorid had been deposited. The anilin hydrochlorid produced in this manner was, however, discolored, and considerable loss occurred owing to the decomposition of the anilin hydrochlorid in concentrating the solution and to the frequent handling of the crystals and the filtrate.

The object of my invention is to avoid these disadvantages.

Further objects are to obtain a product which is not discolored and which may be separated out without the necessity of resorting to repeated filtrations and concentrations.

Further objects of my invention will appear from the detail description contained hereinafter.

While my invention is capable of being carried out in many different ways, for the purpose of illustration, I shall describe only one form of my invention herein.

For example, I may proceed as follows: A quantity of anilin preferably 1 part, may be dissolved in a quantity of a suitable volatile solvent, as for example, benzol, toluol, xylol, solvent naphtha, carbon tetrachlorid, ether, etc., which may be 7 parts. Into or over this solution I may pass a current of dry hydrochloric acid gas. The hydrochloric acid gas is absorbed by the solution and reacts upon the anilin to form anilin hydrochlorid, which is less soluble in the solvent than the anilin and is, therefore, thrown out of the solution as a white granular precipitate. The hydrochloric acid gas is passed into or over the solution until all of the anilin has reacted to form anilin hydrochlorid and is precipitated in the manner above referred to. The anilin hydrochlorid is then filtered off and dried in a warm room. The product thus obtained is a very pure white anilin hydrochlorid, and is obtained with very little loss. The hydrochloric acid gas and anilin and solvent are preferably used dry.

While I have described my invention above in detail, I wish it to be understood that many changes may be made therein without departing from the spirit of my invention.

I claim:

1. The process which comprises reacting upon anilin with hydrochloric acid gas to form anilin hydrochlorid.

2. The process which comprises reacting upon anilin with hydrochloric acid gas to form anilin hydrochlorid by passing the hydrochloric acid gas over the anilin.

3. The process which comprises reacting upon anilin dissolved in a volatile solvent with hydrochloric acid gas to form anilin hydrochlorid.

4. The process which comprises reacting upon anilin dissolved in a volatile solvent with hydrochloric acid gas to form anilin hydrochlorid by passing the hydrochloric acid gas over the solution of the anilin.

5. The process which comprises reacting upon anilin dissolved in benzol with hydrochloric acid gas to form anilin hydrochlorid.

6. The process which comprises reacting upon anilin dissolved in benzol with hydrochloric acid gas to form anilin hydrochlorid by passing the hydrochloric acid gas over the solution of the anilin.

7. The process of producing dry anilin hydrochlorid which comprises reacting upon anilin dissolved in a volatile solvent with hydrochloric acid gas to form anilin hydrochlorid, continuing the process until all of the anilin hydrochlorid has been precipitated, then filtering off the anilin hydrochlorid and drying the same by the application of heat.

8. The process of producing dry anilin hydrochlorid which comprises reacting upon anilin dissolved in a volatile solvent with hydrochloric acid gas to form anilin hydrochlorid by passing the hydrochloric acid gas over the solution of anilin, continuing the process until all of the anilin hydrochlorid has been precipitated, then filtering off the anilin hydrochlorid and drying the same by the application of heat.

9. The process of producing dry anilin hydrochlorid which comprises reacting upon anilin dissolved in benzol with hydrochloric acid gas to form anilin hydrochlorid, continuing the process until all of the anilin hydrochlorid has been precipitated, then filtering off the anilin hydrochlorid and drying the same by the application of heat.

10. The process which comprises reacting upon anilin in a solvent in which it is more soluble than anilin hydrochlorid, by means of hydrochloric acid, to produce anilin hydrochlorid.

11. The process which comprises reacting upon anilin in a volatile solvent in which it is more soluble than anilin hydrochlorid, by means of hydrochloric acid, to produce anilin hydrochlorid.

In testimony that I claim the foregoing I have hereunto set my hand.

C. CHESTER AHLUM.

Witnesses:
P. E. STRICKLAND,
F. L. GALLUP.